US005805292A

United States Patent [19]

Fournier et al.

[11] Patent Number: 5,805,292

[45] Date of Patent: Sep. 8, 1998

[54] CONTROL SYSTEM FOR AUTOMATIC INTENSITY ADJUSTMENT OF LIGHT EMITTERS OF A SHEET SENSOR DEVICE

[75] Inventors: John C. Fournier; John Marcelletti, both of Rochester; Edward P. Furlani, Lancaster; John A. Winterberger, Spencerport, all of N.Y.

[73] Assignee: Eastman Kodak Company, Rochester, N.Y.

[21] Appl. No.: 724,517

[22] Filed: Sep. 30, 1996

[51] Int. Cl.$^{6}$ .................................................... G01N 21/88

[52] U.S. Cl. ...................................... 356/429; 250/559.45

[58] Field of Search ....................... 356/430; 250/559.45, 250/559.46

*Primary Examiner*—Vincent P. McGraw

*Attorney, Agent, or Firm*—Lawrence P. Kessler

[57] ABSTRACT

A control system for an optical sheet sensor device, including at least one light emitter and at least one light detector associated therewith for sensing a sheet in a sheet travel path, having a control system for automatically adjusting the intensity of said light from said light emitter. The control system stores a light emitter current level corresponding to a known valid operating condition where, when a sheet is absent from the sheet travel path, light detected at a light detector beyond a threshold level. A current level at a preset amount off-set from said stored current level is determined. A current is applied to a light emitter, the applied current rising toward a level at which the threshold level for the light detector is reached. The instantaneous applied current level is compared with the determined current level, and an error signal is provided when the applied current level reaches the determined current level. If the determined current level is not reached by the applied current level, the light emitter is operated at the applied current level, and if the determined level is reached, such error signal is provided.

9 Claims, 7 Drawing Sheets

CONTROL SYSTEM FOR AUTOMATIC INTENSITY ADJUSTMENT OF LIGHT EMITTERS OF A SHEET SENSOR DEVICE

BACKGROUND OF THE INVENTION

The present invention relates in general to sheet sensor devices utilizing light emitters/detectors, and more particularly to a control system for a sheet sensor device in which the intensity of light emitters is automatically adjusted to compensate for changes in various operating parameters, such as aging of the light emitters or contamination.

In typical commercial electrostatographic reproduction apparatus (such as copier/duplicators, printers, or the like), a latent image charge pattern is formed on a uniformly charged charge-retentive or photo-conductive member having dielectric characteristics (hereinafter referred to as the dielectric member). Pigmented marking particles are attracted to the latent image charge pattern to develop such image on the dielectric member. A receiver sheet is then brought into contact with the dielectric member, and an electric field applied to transfer the marking particle developed image to the receiver sheet from the dielectric member. After transfer, the receiver sheet bearing the transferred image is transported away from the dielectric member, and the image is fixed (fused) to the receiver sheet by heat and pressure to form a permanent reproduction thereon.

Such reproduction apparatus utilize receiver sheet sensors to determine sheet width, length, or position of a sheet along a sheet transport path. Additionally, receiver sheet sensors may be used at various locations along the sheet transport paths to determine sheet jam conditions. One commonly used type of sheet sensor comprises a light emitter/light detector pair. Generally the light emitter is an LED (light emitting diode) used as a transmitter of radiant energy, and a photocell, photodiode or phototransistor which receives the radiant energy and produces a signal indicative thereof. The sheet sensor can be either reflective or transmissive. That is, with the reflective type sensor, a sheet moves past an emitter and reflects light to an adjacent detector; while with the transmissive type sensor, a sheet moves between the emitter and detector and blocks the radiant energy from the emitter.

It is important that the sheet sensors function properly in order to assure that information is reproduced on receiver sheets in a manner which provides user acceptable copies. Moreover, misfeeds and/or multifeeds of receiver sheets must be reliably detected in order to prevent major malfunctions of the reproduction apparatus. While sheet sensors of the above described type are relatively simple and easy to employ in typical reproduction apparatus, they are susceptible to failure due to changes in operating parameters. For example, operating parameters are particularly adversely effected by aging or contamination of the light emitters.

SUMMARY OF THE INVENTION

In view of the foregoing discussion, this invention is directed to a sheet sensor device having a control system in which the intensity of light emitters is automatically adjusted to compensate for changes in various operating parameters, such as aging or contamination of the light emitters. The control system stores a light emitter current level corresponding to a known valid operating condition where, when a sheet is absent from the sheet travel path, light detected at a light detector beyond a threshold level. A current level at a preset amount off-set from said stored current level is determined. A current is applied to a light emitter, the applied current rising toward a level at which the threshold level for the light detector is reached. The instantaneous applied current level is compared with the determined current level, and an error signal is provided when the applied current level reaches the determined current level. If the determined current level is not reached by the applied current level, the light emitter is operated at the applied current level, and if the determined level is reached, such error signal is provided.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
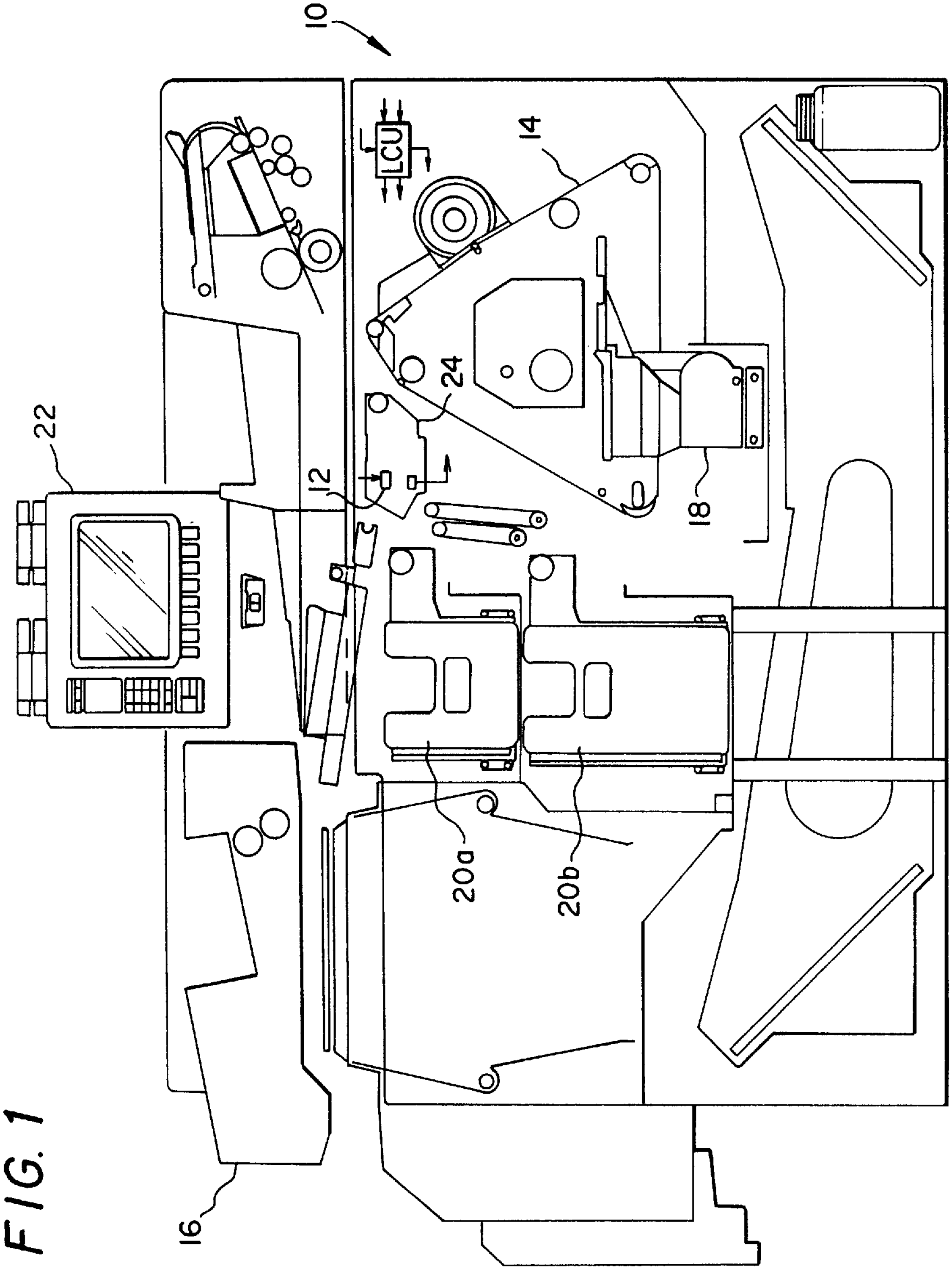
FIG. 1 is a schematic illustration of a typical reproduction apparatus employing at least one receiver sheet sensor device including the automatic intensity adjustment for the light emitters thereof, according to this invention.

Referring now to the accompanying drawings, FIG. 1 shows a typical reproduction apparatus, designated by the numeral 10, employing at least one receiver sheet sensor device 12, including the automatic intensity adjustment for the light emitters thereof, according to this invention. Although this invention is suitable for use with any reproduction apparatus having light emitter/detector type sheet sensors, the typical reproduction apparatus 10 as shown is an electrostatographic reproduction apparatus. The reproduction apparatus 10 includes a charge-retentive or photoconductive member having dielectric characteristics (hereinafter referred to as the dielectric member 14). The dielectric member 14 is uniformly charged, and a latent image charge pattern corresponding to information to be reproduced is formed thereon. The information to be reproduced may be contained in documents presented for copying by the feeder 16.

Pigmented marking particles from a development station 18 are attracted to the latent image charge pattern on the dielectric member 14 to develop such latent image. A receiver sheet fed at an appropriate time from a supply tray (20*a* or 20*b*) is then brought into contact with the dielectric member 14, and an electric field applied to transfer the marking particle developed image to the receiver sheet from the dielectric member. After transfer, the receiver sheet bearing the transferred image is transported away from the dielectric member 14, and the image is fused to the receiver sheet by heat and pressure to form a permanent reproduction thereon.

In order to control the reproduction apparatus 10, the reproduction apparatus includes a logic and control unit (LCU) which receives input signals from an operator communication interface 22 and a plurality of appropriate sensors (not shown) associated in any well known manner with the electrographic stations of the reproduction apparatus 10. Based on such signals and a program for the microprocessor, the LCU produces appropriate signals to control the various operating devices and stations within the reproduction apparatus. The production of a program for a number of commercially available microprocessors is a conventional skill well understood in the art, and do not form a part of this invention. The particular details of any such program would, of course, depend upon the architecture of the designated microprocessor.

As is apparent, one of the operations within the reproduction apparatus 10 which must be sensed is the location of a receiver sheet as it travels through the reproduction apparatus. Such location is important so as to be sure that the information to be copied, in the form of the developed image on the dielectric member 14, is appropriately placed on the receiver sheet to form an acceptable reproduction, and that operation of the reproduction apparatus is interrupted in the event that there is a missed or multitude of receiver sheets. For example, as shown in FIG. 1, the location of a receiver sheet is sensed when the sheet is in the registration assembly 24. Of course, the receiver sheet location may be sensed at many other significant locations along the sheet travel path, such as entering the travel path from a supply tray or exiting the travel path after a developed image has been fused thereto.

Figure 2:
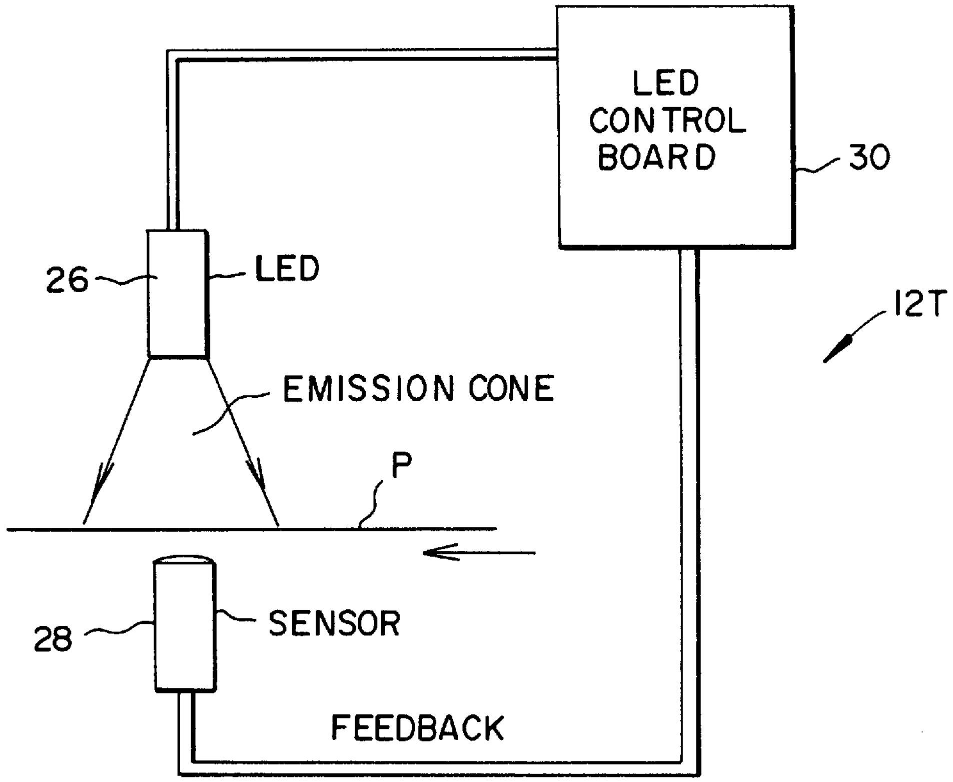
FIG. 2 is a schematic illustration of a transmissive type receiver sheet sensor device, including the automatic intensity adjustment for the light emitters thereof, according to this invention.
Figure 3:
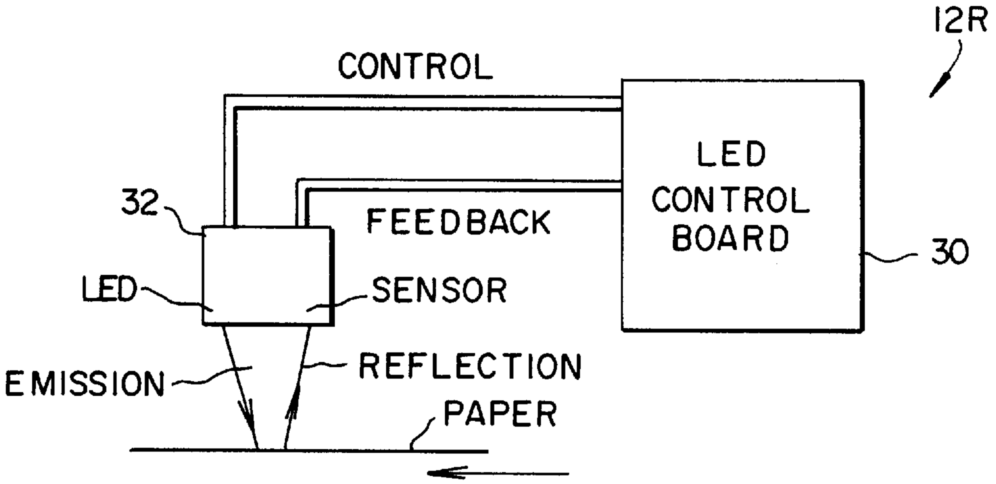
FIG. 3 is a schematic illustration of a reflective type receiver sheet sensor device, including the automatic intensity adjustment for the light emitters thereof, according to this invention.

FIGS. 2 and 3 respectively show two types of the sensor device 12 suitable for detecting receiver sheets as the sheets travel through the reproduction apparatus. FIG. 2 depicts a transmissive type sensor, designated as sensor 12T. For sensor 12T, a light emitter such as an LED 26 is positioned on one side of a receiver sheet travel path P, and a light detector 28 is positioned on the opposite side of the travel path. Under the control of a digital logic control device 30, appropriate signals are sent to the LED 26 to turn the LED on (at a predetermined intensity level) and off. Meanwhile, the detector 28 communicates with the digital logic control device 30 to feed back detection signals based on the intensity of light passing through the travel path P (typically, the light is blocked when a sheet is present between the emitter and detector). FIG. 3 depicts a reflective type sensor, designated as sensor 12R. For sensor 12R, a combination light emitter and detector 32 is positioned on one side of a receiver sheet travel path P. Under the control of a digital logic control device 30, appropriate signals are sent to the combination light emitter and detector 32 to turn the emitter portion on (at a predetermined intensity level) and off, while the detector portion communicates with the digital logic control device 30 to feed back detection signals based on the intensity of light reflected from a sheet in the travel path P (typically, the light is only reflected when a sheet is present adjacent to the emitter and detector).

Figure 4:
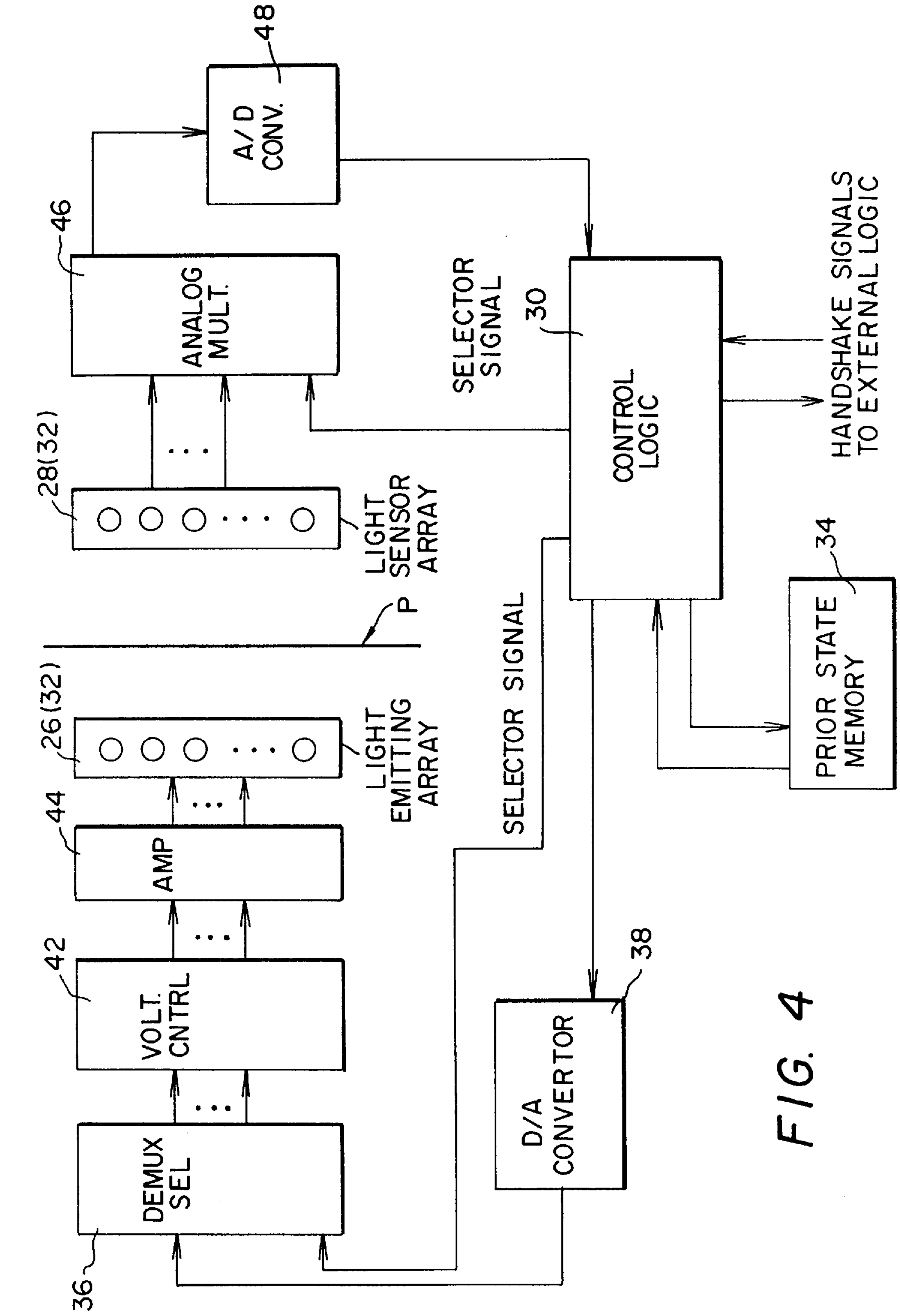
FIG. 4 is a block diagram of the control for the automatic intensity adjustment for the light emitters of the receiver sheet sensor of FIGS. 2 or 3.

FIG. 4 is a block diagram of the control for the receiver sheet sensor 12, such as sensor 12T or 12R shown in FIGS. 2 and 3 respectively, and in particular for the automatic intensity adjustment for the light emitters thereof, according to this invention. An array of light sources such as an LED, and an array of light detectors, such as phototransistors, photodiodes or photocells are controlled and monitored by a digital logic control device 30. The digital logic control device 30 communicates the instant sensor state and any error messages with the logic and control unit L of the reproduction apparatus 10. It also maintains a non-volatile memory 34 which contains a history of prior states of the controlled LED array and associated responses from the detectors. The digital logic control device 30 will output a particular selection signal to the demultiplexer/selector 36 to choose which LED (or LED's) in the array is to be controlled. It will then output a digital signal to the digital-to-analog converter 38. An analog voltage from the converter 38 is communicated to the demultiplexer/selector 36, which in turn is sent to the appropriate channel of the voltage-controlled current source 42. The appropriate channel of current source 42 is fed to the current amplifier 44, which in turn drives the chosen light(s) in the light emitter array (e.g., output device 26 or 32).

The light emitted from the light emitter array (output device 26 or light emitter portion of element 32) is passed across the sensing channel (i.e., the receiver sheet travel path P) to the sensor array (detector 28 or light detector portion of element 32). The output signal from the sensor array is passed to an analog multiplexer 46 under the control of the digital logic control device 30. The analog signal from the multiplexer 46 is converted to a digital signal by an analog-to-digital converter 48, which signal is sent to the digital logic control device 30. In the simplified case of a single digital bit signal, the analog-to-digital converter 48 could be reduced to a level comparator circuit.

Figure 5:
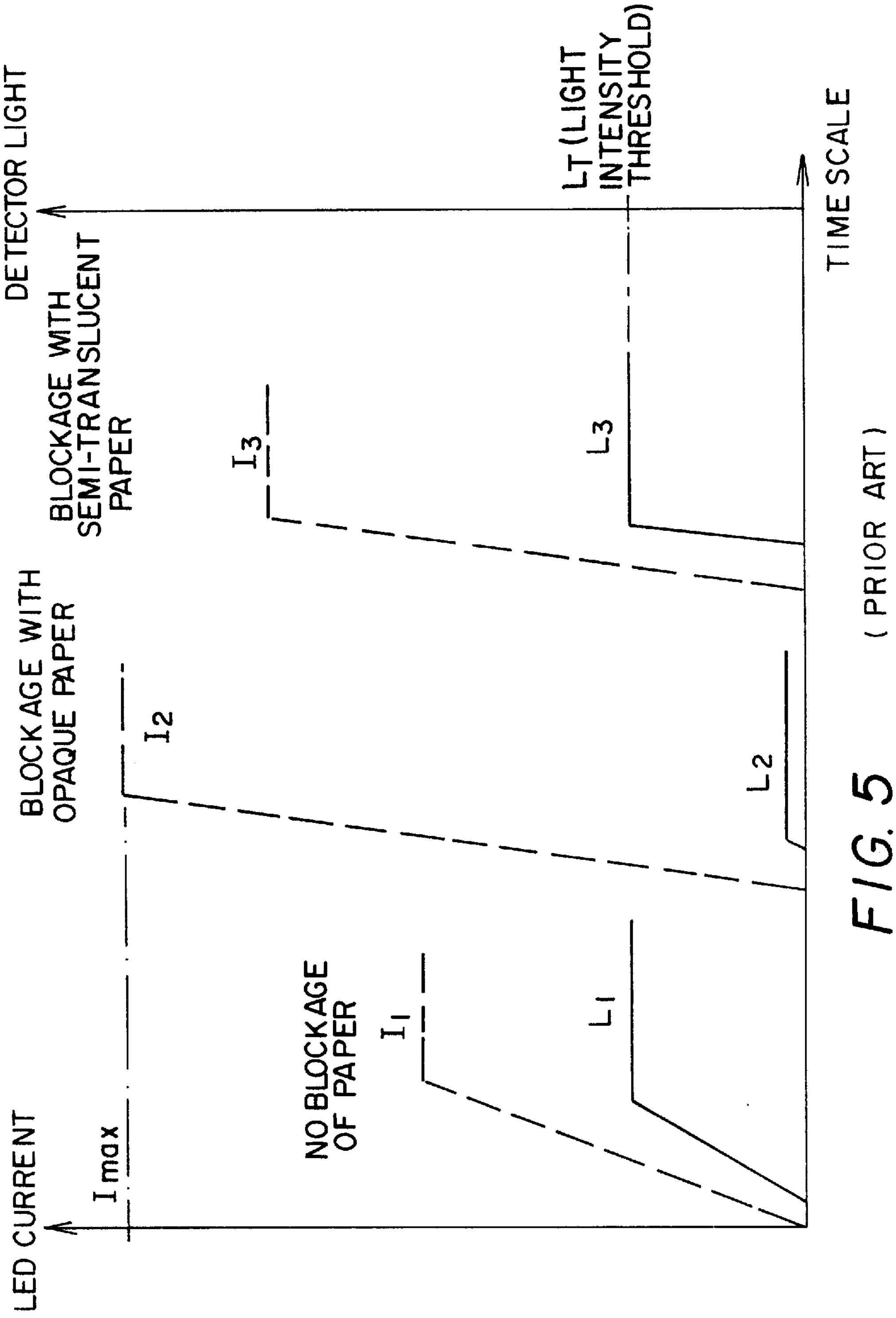
FIG. 5 (PRIOR ART)
FIGS. 5 and 7 are graphical representations of the response time, under different conditions, for prior art receiver sheet sensor devices.
Figure 6:
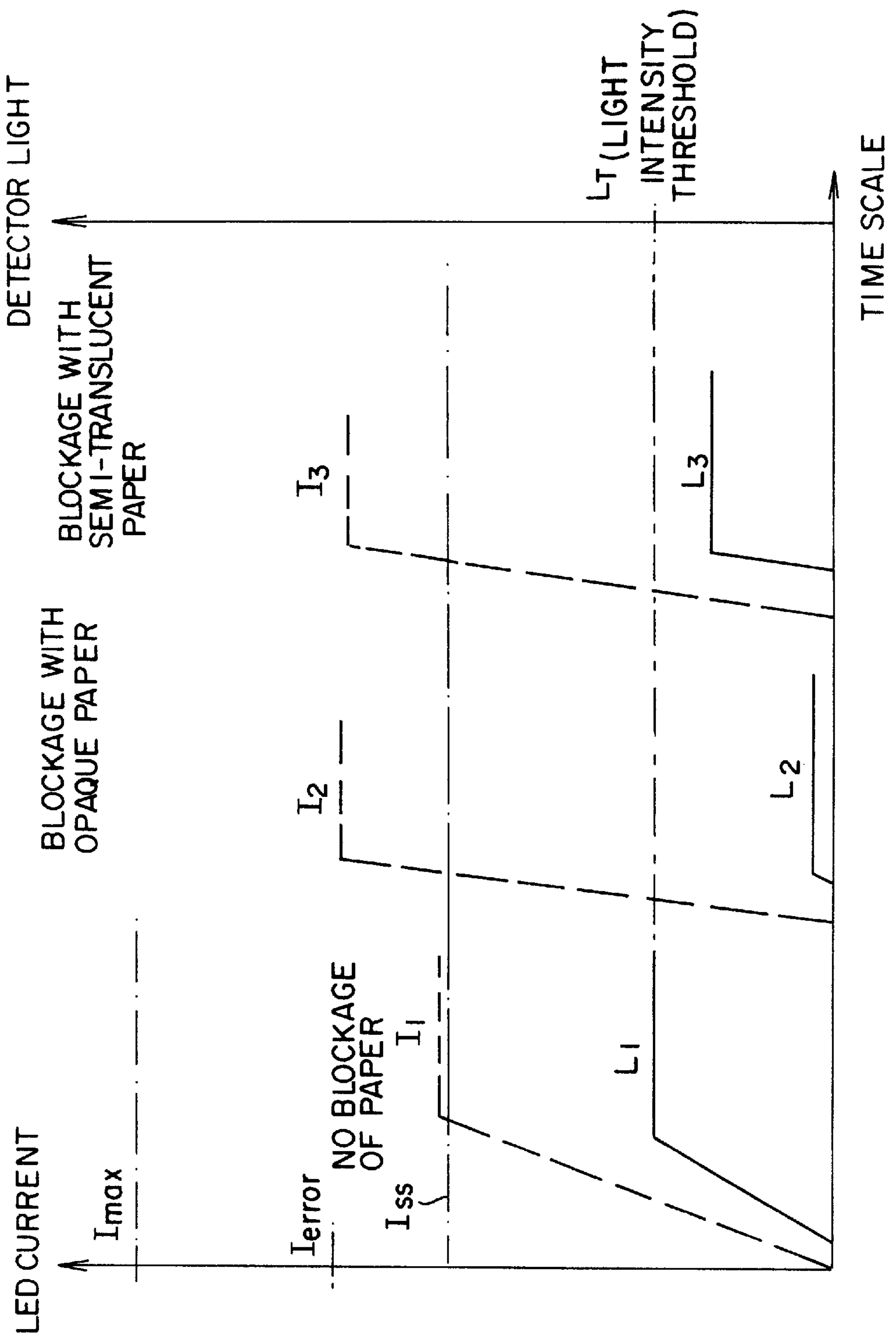
FIGS. 6 and 8 are graphical representations of the response time, under different conditions, for the receiver sheet sensor device including the automatic intensity adjustment for the light emitters thereof, according to this invention.
Figure 7:
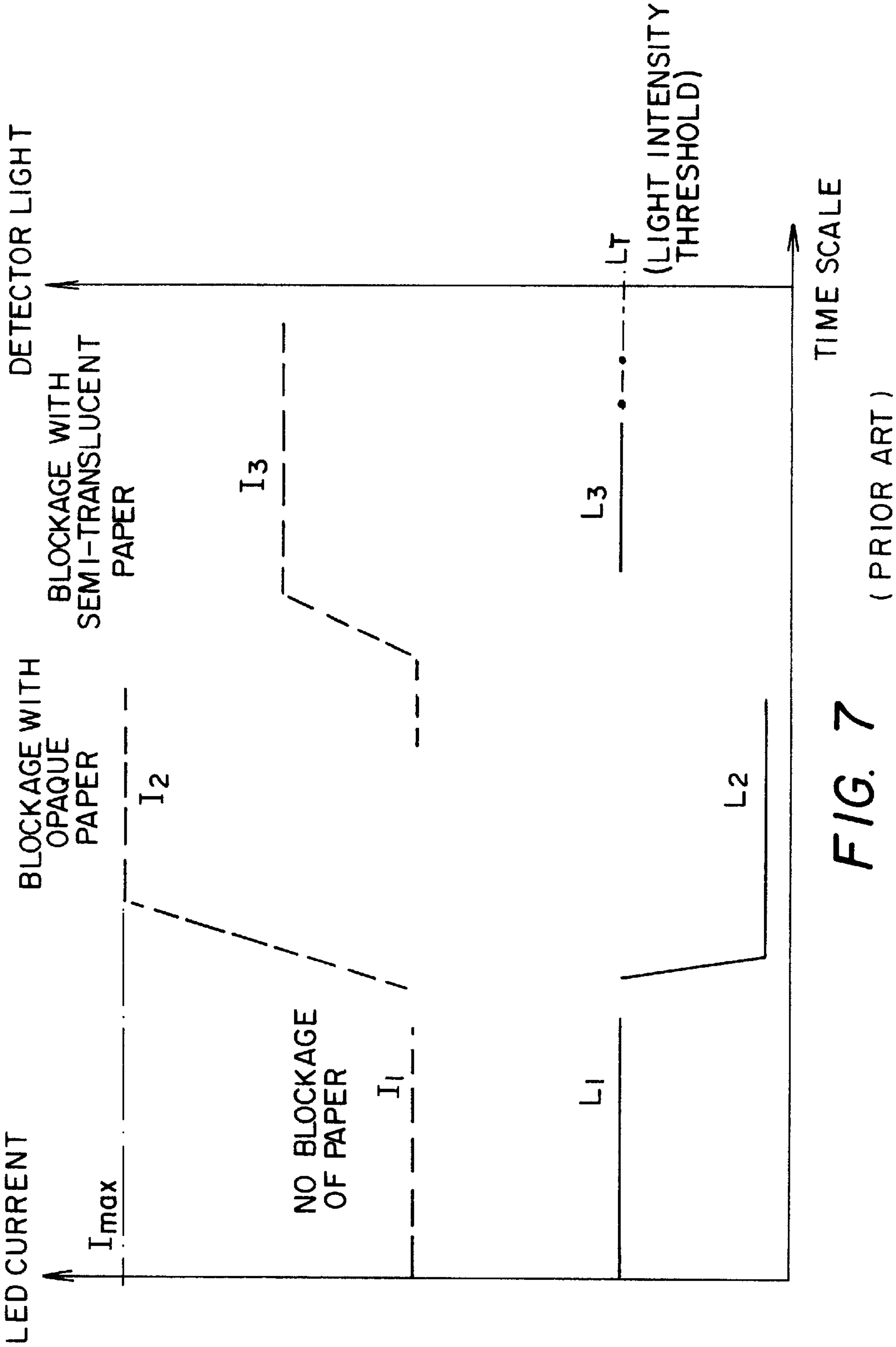
FIG. 7 (PRIOR ART)
Figure 8:
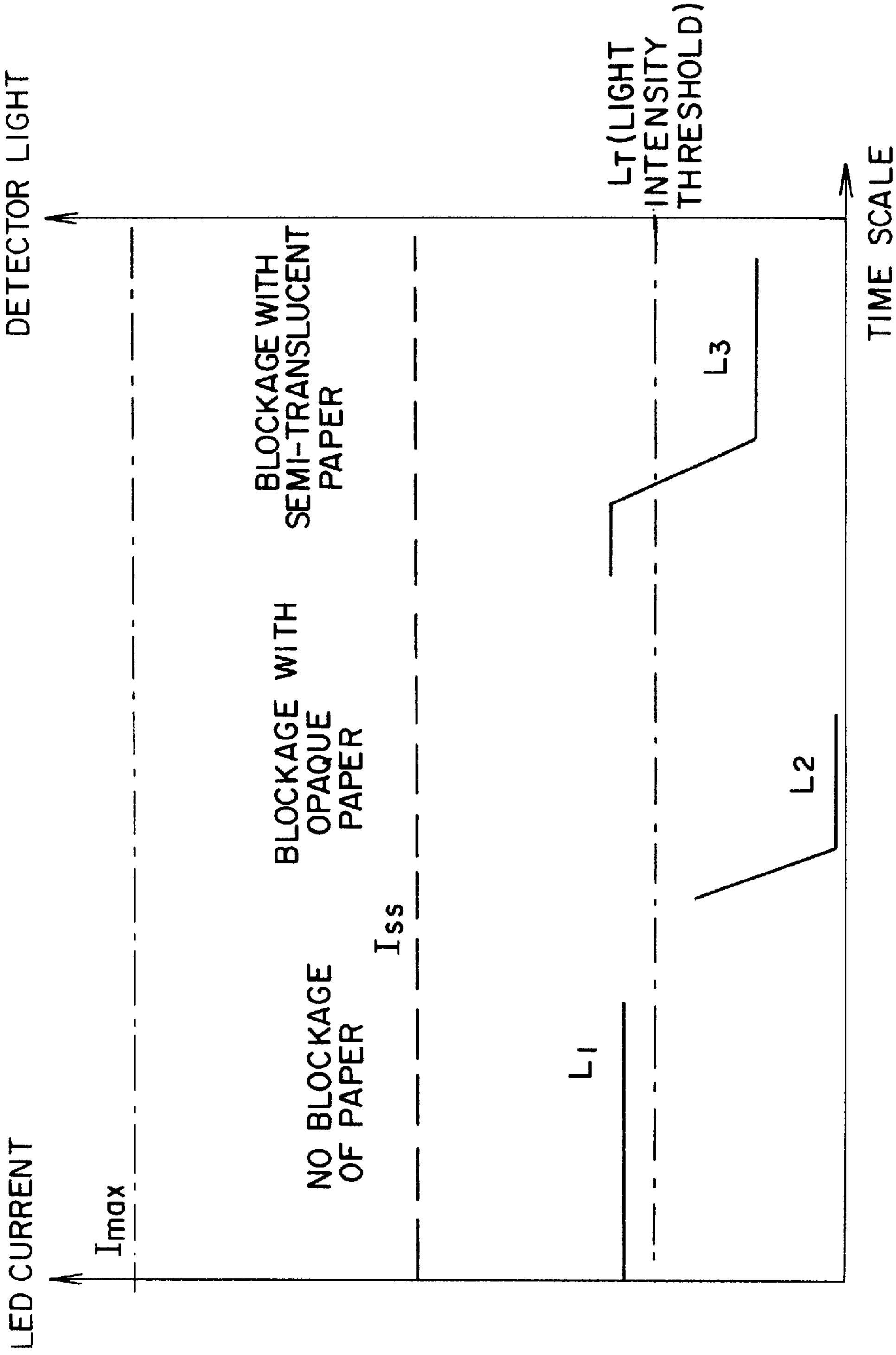

Optical receiver sheet sensor systems, of both the transmissive and reflective type, have a set of fixed operating parameters for both the emitter of light and the light detector. They are thus sensitive to operating parameter variations caused by contamination over the optical surfaces, such as dust, and aging of the components that affect light sensitivity or detection efficiency. The graphs of FIGS. 5 and 7 illustrate, for two distinct operating conditions, the time response of prior art transmissive type sheet sensor control systems, and the graphs of FIGS. 6 and 8 illustrate the time response of a transmissive type sheet sensor control (depicted in FIG. 4) according to this invention. It is, of course, understood that graphs of time response for reflective type sheet sensor devices may be developed which will show similar characteristics (the difference between the reflective type sheet sensors and the transmissive type sheet sensors being whether or not a sheet is blocking when a high light signal is detected). The first condition concerns the system at power-up and initialization. As is common with reproduction apparatus, a receiver sheet jam may cause an operator to power down the reproduction apparatus with the jammed receiver sheet still present in the receiver sheet travel path. The second condition relates to the response for varying receiver sheet properties themselves. Typically used receiver sheets have a wide variety of light transmission properties. Such transmission properties can range from highly opaque, as in the case of heavy weight receiver sheets, to receiver sheets which allow considerable light to be transmitted therethrough such as very light weight sheets.

In a power-up condition, neither the prior art sheet sensor control system nor the sheet sensor control according to this invention know immediately whether a receiver sheet was jammed or left in the travel path at a sensor at the last shutdown of the reproduction apparatus. In graph of FIG. 5, the three examples of no receiver sheet, an opaque receiver sheet, and a semi-translucent receiver sheet are shown with the prior art sheet sensor control system response upon a power-up condition. With no receiver sheet present, the control system responds normally, and stabilizes at the normal steady-state levels; that is, LED current level $I_1$ and detector light level $L_1$ (at or above the threshold level $L_T$). With an opaque receiver sheet blocking the sensor, the LED current once again will rise in an attempt to bring the detector light level to the threshold level $L_T$ necessary to provide a signal to the control system indicating absence of a sheet at the sensor. If the receiver sheet is opaque enough, the detector light level $L_2$ would remain below the threshold level $L_T$ as the LED current level rises to its maximum possible value, and allow the control system to signal an error condition (i.e., a jammed sheet left in the sheet travel path at the sensor). In the final instance shown in the graph of power-up, with a semi-translucent receiver sheet, the LED current will adjust to the level $I_3$, which may be sufficient to bring the LED light level $L_3$ above the threshold level $L_T$. This is referred to as light "bleed-through" and will not generate an error signal, even though the reproduction apparatus has powered-up with an existing error condition of a jammed receiver sheet present in the sheet travel path at the sensor. This would allow the reproduction apparatus to feed further receiver sheets into the sheet travel path to the sensor area, which could result in further sheet jamming and potentially serious damage to the reproduction apparatus.

With the sheet sensor control system according to this invention, power-up and initialization response occurs in the following described manner to overcome the above problem of the prior art system. As shown in the graph of FIG. 6, an LED current level value $I_{ss}$ from the last known operating valid operating condition is stored in the permanent, non-volatile memory 38. When the reproduction apparatus is powered-up, the LED current is increased gradually. With no receiver sheet present at the sensor, the LED current level $I_1$ which is reached when the corresponding light intensity threshold $L_T$ is reached is within an empirical percentage of the last LED current level $I_{ss}$. In the instance of an opaque receiver sheet blocking the sensor, the LED current rises in an attempt to bring the detector light level to the threshold level $L_T$ necessary to provide a signal to the control system indicating absence of a sheet at the sensor. As such, the LED current level will reach a level, above the LED current level $I_{ss}$ and continue to rise until it reaches a predetermined LED current level $I_{error}$. The LED current level $I_{error}$ is calculated upon power-up and will generally be of a pre-set amount above the stored level $I_{ss}$. Since the amount of change in light intensity required normally varies only very slightly from power-up cycle to power-up cycle, the LED current level $I_{error}$ signal is quite simply derived empirically from the previous LED current level $I_{ss}$ value. Trends in the calculated error signals and the variations in the normal steady-state LED current level signals may be identified, and stored in the memory 38 as an operational history of the light emitters and light detectors. From such historical data, time-to-failure may be readily predicted as an aid to service for the receiver sheet sensors.

The LED current level will not be allowed to rise above the level $I_{error}$ value. Instead, when the level $I_{error}$ value is reached, an error message will be sent indicating that jammed receiver sheet is present in the sheet travel path at the sensor. In the instance of blockage of the sensor by a semi-translucent receiver sheet, due to the particular predetermined LED current level $I_{error}$, the amount of light attenuation will still be enough to attempt to force the LED current level above the level $I_{error}$. Accordingly, this will also signal the error condition, since the LED current will rise above level $I_{error}$ before the detector light level $L_3$ rises above the threshold level $L_T$. The blocking receiver sheet can then be safely removed from the sensor area and, once the sheet has been removed, the control system responds again as in the unblocked sensor example.

It should be pointed out that the receiver sheet sensor control according to this invention has another distinct attribute. In the described typical receiver sheet sensor arrangements, multiple sensor pairs (a light emitter/light detector) are typically located in a crosstrack direction to the receiver sheet travel path to determine the crosstrack position of receiver sheet of varying widths. With such arrangements, if an error condition is detected upon power-up, the control system according to this invention is able to distinguish between the condition of a jammed receiver sheet present at the sensor or a failed sensor pair detector or light source. To accomplish such determination, if the appropriate pair for the receiver sheet size is indicating an error, the next smaller size receiver sheet pair can be checked as well by suitable interrogation signals from the control logic 30. If the error condition is truly a jammed receiver sheet blocking the sensor, the adjacent next smaller receiver sheet size sensor and all subsequent smaller receiver sheet size sensors will also give an indication that they are blocked. If the indication is that subsequently interrogated sensor elements are not blocked, the control system can predict with a high degree of probability that the first sensor pair has failed, and that a jam has not in fact occurred. This will enable the reproduction apparatus to continue operating in a mode in which the particular failed sensor pair is simply ignored. It would also be of significant aid to service personnel, directing them to the particular failed sensor.

The graph of FIG. 7 shows the prior art approach to control the light emitting sheet sensors for the various receiver sheet light transmission properties. At the left of the graph is the steady state value of LED current (proportional to light output intensity of the light emitter), and the light intensity received at the light detector. The light received is analogous to the voltage measured with a phototransistor as the detector. The LED current $I_1$, is the current that the control system requires to make the steady-state detector light level $L_1$ reach the threshold level $L_T$. This condition exists until the system is blocked by an opaque (e.g., heavy-weight) receiver sheet. The light level at the detector begins to drop and the control system responds by increasing the LED current $I_2$, until it reaches the maximum current $I_{max}$ that the system can produce. The detector light level then drops to the level $L_2$, which if the receiver sheet is opaque enough, will be below the threshold level $L_T$. The control system will thus provide a signal to the reproduction apparatus that a receiver sheet is indeed present at the sensor. If a sheet is somewhat translucent to light (e.g., light-weight sheet), the output of the light detector will rise to level $L_3$. The LED current required to reach this detected light level will be higher than the LED current level $I_1$ (but may well be below $I_{max}$) since some blockage of the sensor occurs due to the presence of a receiver sheet. If the receiver sheet allows enough light to pass through it, the detector light level $L_3$ may reach a value above the threshold level $L_T$, and the control system will stabilize at a point where a receiver sheet, even though present, is no longer detected. This condition represents a significant error in the control system of the prior art, and inhibits the system from being able to provide control for a wide range of receiver sheet light transmission properties (and corresponding weights).

On the other hand, in the graph shown in FIG. 8, the sheet sensor control response, according to this invention, for the same receiver sheet transmission properties is shown. The steady-state LED current $I_{ss}$, which has been previously set during the power-up sequence (as described above), has resulted in the detector light level $L_1$ with no receiver sheet blockage. With the introduction of an opaque receiver sheet, the light level drops to the detector light level $L_2$, and the control system signals a receiver sheet blockage. When a semi-translucent receiver sheet is introduced, the detector light level drops, but only to the level $L_3$, which will still be below the threshold level $L_T$. This is because the steady-state LED current level $I_{ss}$, determined at power-up, represents the LED current for a maximum light detector level signal (i.e., no sheet present), and may therefore be held constant. Changes in the light detection level below the threshold level $L_T$ thus always result in the control system providing a signal that a receiver sheet has been detected at the sensor.

The invention has been described in detail with particular reference to preferred embodiment thereof, but it will be understood that variations and modifications can be effected within the spirit and scope of the invention as set forth in the claims.

What is claimed is:

1. In an optical sheet sensor device including at least one light emitter and at least one light detector associated therewith for sensing the presence of a sheet in a sheet travel path, a method for controlling said sheet sensor device in order to automatically adjust the intensity of said light from said light emitter to accommodate for changes in operating parameters over time, said control method comprising the steps of:

storing a light emitter current level corresponding to a known previous valid operating condition where, when a sheet is absent from the sheet travel path, light is detected at a light detector beyond a threshold level;

determining a current level at a preset amount off-set from said stored light emitter current level;

applying current to a light emitter, said current as applied changing in level so as to attempt to bring light level at said light detector to the threshold level for the light detector when no sheet is detected;

comparing an instantaneous current level applied to such light emitter with said determined current level, and providing an error signal when said instantaneous light emitter current level reaches said determined current level; and if said determined current level is not reached by said instantaneous light emitter current level, operating said light emitter at said instantaneous light emitter current level, and if said determined level is reached, providing said error signal.

2. The sheet sensor control device of claim 1 wherein at said comparing step, storing the history of said instantaneous light emitter current level, and based on such history, determining the time to failure of said sensor device.

3. In an optical sheet sensor device including at least one light emitter and at least one light detector associated therewith for sensing the presence of a sheet in a sheet travel path, a control system for said sheet sensor device to accommodate for changes in operating parameters of said sheet sensor over time, said control system comprising:

storing means for storing a light emitter current level corresponding to a known previous valid operating condition where, when a sheet is absent from said travel path, light detected at a light detector is beyond a threshold level;

means for determining a current level at a preset amount off-set from said stored light emitter current level;

means for applying current to a light emitter, said current as applied changing in level so as to attempt to bring light level at said light detector to the threshold level for the light detector when no sheet is detected;

comparing means for comparing an instantaneous current level applied to such light emitter with said determined current level, and providing an error signal when said instantaneous light emitter current level reaches said determined current level; and operating means where if said determined current level is not reached by said instantaneous light emitter current level, operating said light emitter at said instantaneous light emitter current level, and if said determined level is reached, providing said error signal.

4. The sheet sensor control device of claim 3 wherein said comparing means includes means for storing the history of said instantaneous light emitter current level, and means for determining the time to failure of said sensor device based on such history.

5. The sheet sensor device control system of claim 3 wherein said sheet sensor device includes a plurality of light emitters and a plurality of light detectors respectively associated therewith, said light emitter/light detector pairs being located in a cross-track direction with respect to the sheet travel path, and said control device further includes means for sequentially interrogating adjacent light emitter/light detector pairs in order to determine if said adjacent pair also indicates an error, or indicates the presence of a sheet whereby it can be predicted that the previous light emitter/light detector has failed.

6. An optical sheet sensor device comprising:

at least one light emitter;

at least one light detector associated with said light emitter for sensing the presence of a sheet in a sheet travel path; and a control system for said sheet sensor device, said control system including:

(a) storing means for storing a light emitter current level corresponding to a known previous valid operating condition where, when a sheet is absent from said travel path, light detected at a light detector is beyond a threshold level;

(b) means for determining a current level at a preset amount off-set from said stored light emitter current level;

(c) means for applying current to a light emitter, said current as applied changing in level so as to attempt to bring light level at said light detector to the threshold level for the light detector when no sheet is detected;

(d) comparing means for comparing an instantaneous current level applied to such light emitter with said determined current level, and providing an error signal when said instantaneous light emitter current level reaches said determined current level; and (e) operating means where if said determined current level is not reached by said instantaneous light emitter current level, operating said light emitter at said instantaneous light emitter current level, and if said determined level is reached, providing said error signal.

7. The sheet sensor device of claim 6 wherein said sheet sensor device includes a plurality of light emitters and a plurality of light detectors respectively associated therewith, said light emitter/light detector pairs being located in a cross-track direction with respect to the sheet travel path.

8. The sheet sensor device of claim 7 wherein said control device further includes means for sequentially interrogating adjacent light emitter/light detector pairs in order to determine if said adjacent pair also indicates an error, or indicates the presence of a sheet whereby it can be predicted that the previous light emitter/light detector has failed.

9. The sheet sensor device of claim 8 wherein said comparing means includes means for storing the history of said instantaneous light emitter current level, and means for determining the time to failure of a light emitter/light detector pair of said sensor device based on such history.

* * * * *